United States Patent [19]

Coué

[11] Patent Number: 4,516,961
[45] Date of Patent: May 14, 1985

[54] DERAILLEUR HAVING AN ADJUSTABLE FORK MEMBER FOR A CRANK-GEAR

[75] Inventor: Maurice E. L. Coué, Feucherolles, France

[73] Assignee: Huret et ses Fils, Nanterre, France

[21] Appl. No.: 452,716

[22] Filed: Dec. 23, 1982

[30] Foreign Application Priority Data

Dec. 30, 1981 [FR] France ................. 81 24504

[51] Int. Cl.³ .............................................. F16H 9/00
[52] U.S. Cl. ................................................. 474/80
[58] Field of Search ................................. 474/80, 82

[56] References Cited

U.S. PATENT DOCUMENTS 4,078,444  3/1978  Huret ........................... 474/82

FOREIGN PATENT DOCUMENTS 445255  2/1949  Italy ............................. 474/80
2036895  7/1980  United Kingdom ......... 474/82

Primary Examiner—James A. Leppink
Assistant Examiner—Frank H. McKenzie, Jr.
Attorney, Agent, or Firm—Trexler, Bushnell & Wolters, Ltd.

[57] ABSTRACT

The derailleur comprises a chain guiding and shifting device in the form of a fork member (2) articulated to a support (1) adapted to be fixed to the frame of the bicycle. At least one (4) of the wings of the fork member (2) has a part (11) which is adjustable in position so as to adapt the width of the at least one wing (4) to the diameter of the small chain wheel of the crank-gear.

13 Claims, 3 Drawing Figures

DERAILLEUR HAVING AN ADJUSTABLE FORK MEMBER FOR A CRANK-GEAR

DESCRIPTION

The present invention relates to derailleurs for bicycle crank-gears.

A derailleur for a crank-gear usually comprises a movable chain guiding or shifting means, this means being articulated to a support adapted to be fixed to the frame of the bicycle.

The chain shifting and guiding means is in the form of a fork member having an elongated curvilinear shape which is articulated by its web to the support.

The web of the fork member interconnects the wings of the latter in the vicinity of their front ends while the wings are interconnected at their rear end by a spacer member interposed between the wings and fixed to the latter by a screw-and-nut assembly.

The wings of the fork member which constitute the means for transversely shifting the chain, have different widths, the outer wing adapted to shift the chain from a chain wheel of large diameter to a chain wheel of a smaller diameter being narrower than the inner wing adapted to shift the chain from a chain wheel of smaller diameter to a chain wheel of larger diameter.

However, in many cases, the dimensions of the width of the wings of the fork member, and principally of the inner wing, are too small to permit a definite contact between the fork member and the chain when it concerns shifting the latter from a small chain wheel.

An object of the invention is to overcome the aforementioned drawback of known derailleurs by providing a derailleur which permits shifting the chain from a small chain wheel to a larger chain wheel which is achieved more definitely than with the arrangements of the prior art.

The invention therefore provides a derailleur for a crank-gear of a bicycle comprising a chain guide and shifting means constructed in the form of a fork member articulated by its web to a support adapted to be fixed to the frame of the bicycle, wherein a first one of the wings of the fork member has a first wing part which is adjustable in position relative to a second wing part so as to adapt the width of said first wing to the diameter of the small chain wheel of the crank-gear.

Further features of the invention will be apparent from the ensuing description.

In the accompanying drawings, which are given solely by way of example:

Figure 1:
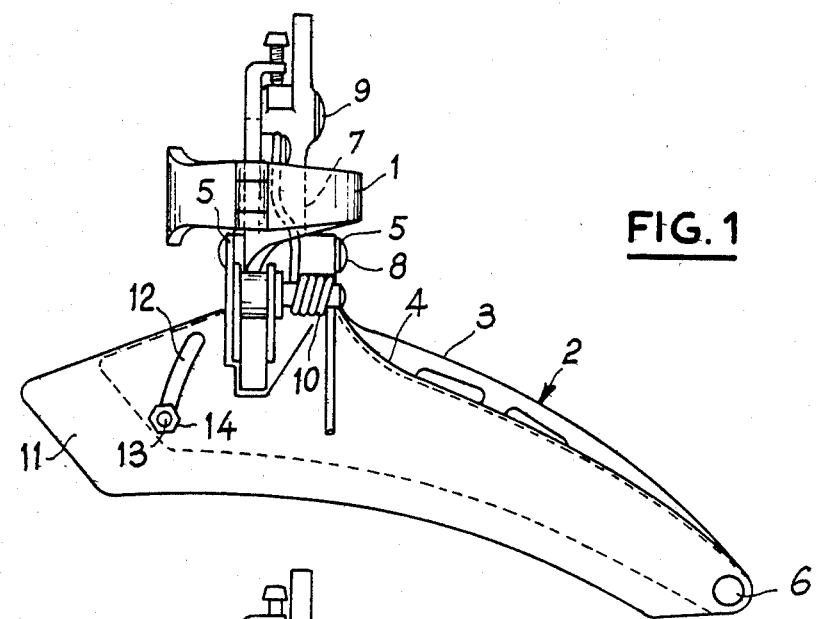
FIG. 1 is an elevational view of a first embodiment of the derailleur for a crank-gear according to the invention.

The derailleur for a crank-gear shown in FIG. 1 comprises mainly a support 1 in the form of a collar adapted to be fixed to the frame (not shown) of a bicycle. Articulated to the support is a fork member 2 whose web interconnects wings 3 and 4 in the front part of the fork member and has tabs 5 formed over at a right angle. In their rear part, the wings 3 and 4 of the fork member are interconnected by a screw-and-nut assembly 6 with interposition of a spacer member (not shown). Articulated between the tabs 5 of the web of the fork member is an intermediate member 7 which is rotatably mounted by means of a pin 8 and articulated to the support 1 by means of a pin 9. A return spring 10 whose end bears against the wing 4 of the fork member and whose other end is hooked to the support 1, maintains the fork member in abutting relation to the support 1.

In FIG. 1, the derailleur according to the invention is facing in such direction as to render visible the inner or first wing 4 adapted to shift the chain from a chain wheel of smaller diameter to a chain wheel of larger diameter.

When the small chain wheel of a crank-gear of a bicycle has a number of teeth which is such that its upper teeth, and consequently the chain they carry, are located at a height which is insufficient to ensure that the inner wing 4 of the fork member has a sufficiently large area of contact to ensure the shifting of the chain from the small chain wheel to the large wheel in a definite manner, there is a danger that a delay occur between the actuation of the derailleur and the changing of the speed ratio of the crank-gear. Moreover, the chain is liable to come in contact with the fork member on a short length of the latter and this might result in defective engagement between the chain and the larger chain wheel. Also, there is a danger that the chain will purely and simply jump.

In order to overcome these drawbacks, there is mounted on the inner wing 4 an additional member 11 which has a shape similar to that of the wing 4. The member 11 is mounted to pivot about the screw 6 which interconnects the wings 3 and 4. In its front part, the member 11 has an aperture 12 through which extends a screwthreaded rod 13 secured to the wing 4. Consequently, the member 11 can be adjusted in height relative to the inner wing 4 so as to adapt the width of this wing to the dimensions of the small chain wheel of the crank-gear with which the derailleur must be associated. A nut 14 cooperating with the screwthreaded rod 13 holds the member 11 in its position of adjustment.

Therefore, it can be seen that, with this arrangement, the inner wing 4 of the fork member can have an optimum area of contact with the chain when the latter is placed on the small chain wheel of the crank-gear for various diameters of the small chain wheel.

In the embodiment just described, the additional member 11 is formed by a metal plate inserted between the surface of the wing 4 and the lower end portion of the return spring 10.

Upon the adjustment in height of the additional member 11 and the immobilization of the latter on the inner wing 4 by means of the nut 14, the wing 4 and the additional member 11 form a rigid unit.

Figure 2:
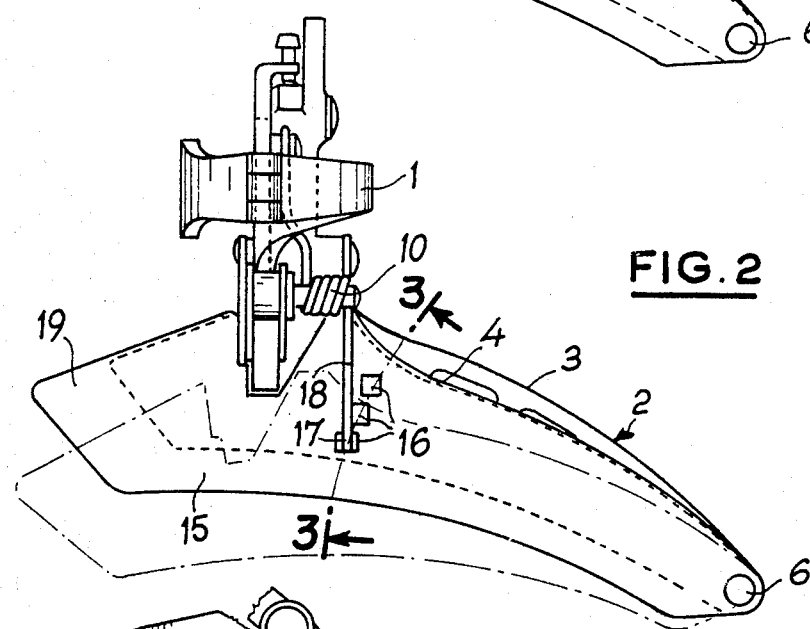
FIG. 2 is an elevational view of a second embodiment of the derailleur for a crank-gear according to the invention and, FIG. 3 is a sectional view taken on line 3—3 of FIG. 2.
Figure 3:
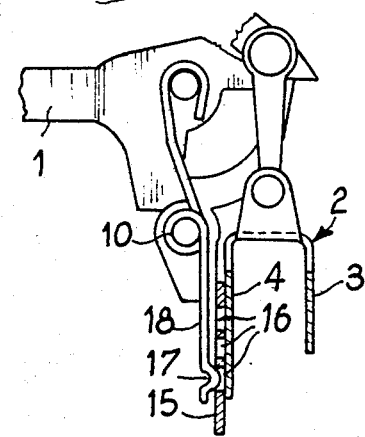

The embodiment shown in FIG. 2 differs from that of FIG. 1 in that the inner wing 4 of the fork member is associated with an additional member 15 which is of elongated and curved shape similar to the ring 4 but which is no longer rigidly secured to the latter. The additional member 15 is, as the member 11 of FIG. 1, mounted to be angularly movable about the screw 6 interconnecting the wings 3 and 4. However, its adjustment in height is ensured by the cooperation of apertures 16 arranged in evenly spaced-apart relation in the member 15 and located on a circle centered on the screw 6, on one hand, and the end portion 17 of the inner branch 18 of the return spring 10, on the other hand. The end 17 of the branch 18 is formed by a nose portion which penetrates into one of the apertures 16 and ensures the immobilization of the plate 15 in the desired position of adjustment and ensures the elastically yieldable maintenance of the member 15 against the wing 4. Thus the additional member 15 not only permits adjusting the effective width of the inner wing 4 of the fork member, it constitutes by its front part 19 which projects from the wing 4, an elastically yieldable element which, in temporarily moving away upon the contact of the wing 4 with the chain, facilitates the transverse shifting of the latter from a chain wheel of small diameter to a chain wheel of larger diameter.

Although in the embodiments just described only one of the wings of the fork member has an additional plate adjustable in height, such an arrangement may also be contemplated for the other wing of the fork member.

Having now described my invention what I claim as new and desire to secure by Letters Patent is:

1. A derailleur of a bicycle crank-gear having a small chain wheel and a larger chain wheel and a chain for engaging a selected one of said chain wheels, said derailleur comprising a support for fixing to a frame of the bicycle, a chain guiding and shifting means including a fork member articulated to the support, the fork member having a web and two wings depending from opposite sides of the web, a first of said wings being provided for engaging a first side of said chain when shifting the chain from said small chain wheel to said larger chain wheel and a second of said wings being provided for engaging a second side opposite said first side of said chain when shifting said chain from said larger chain wheel to said small chain wheel, said first wing comprising a first wing part and a second wing part which define therebetween a width of the first wing and said first wing part being adjustable to a fixed position relative to said second wing part so as to adapt said width of said first wing to various diameters of the small chain wheel, and means for immobilizing said first wing part in the adjusted position thereof.

2. A derailleur according to claim 1, wherein said first wing part of said first wing is defined by an additional member in the form of a plate, and articulation means articulate said plate to said second wing part at a given point.

3. A derailleur according to claim 2, wherein the fork member comprises means for interconnecting said first and second wings in a rear part of the wings relative to forward travel of the bicycle, said interconnecting means also consitituting said articulation means.

4. A derailleur according to claim 2, wherein said means for immobilizing the additional member in said adjusted position comprise means defining an aperture on said additional member, a screwthreaded rod fixed to said second wing part of said first wing and engaged in said aperture, and a nut cooperating with said screwthreaded rod for immobilizing said additional member.

5. A derailleur according to claim 3, wherein said means for immobilizing the additional member comprise means defining an aperture on said additional member, a screwthreaded rod fixed to said second wing part of said first wing and engaged in said aperture, and a nut cooperating with said screwthreaded rod for immobilizing said additional member.

6. A derailleur according to claim 2, wherein said immobilizing means for the additional member comprise means defining a series of apertures on the additional member, said apertures being located on a circle centered on said given point of articulation, and a spring for elastically maintaining the additional member against said second wing part of said first wing, the spring having an end portion engaged in one of said apertures of the additional member which corresponds to the desired adjustment.

7. A derailleur according to claim 3, wherein said immobilizing means for the additional member comprise means defining a series of apertures on the additional member, said apertures being located on a circle centered on said given point of articulation, and a spring for elastically maintaining the additional member against said second wing part of said first wing, the spring having an end portion engaged in one of said apertures of the additional member which corresponds to the desired adjustment.

8. A derailleur according to claim 6, wherein said spring is a return spring for the derailleur and has a branch having an end nose portion which is cooperative with said apertures in the additional member.

9. A derailleur according to claim 7, wherein said spring is a return spring for the derailleur and has a branch having an end nose portion which is cooperative with said apertures in the additional member.

10. A derailleur according to claim 6, wherein the additional member has a front portion relative to the direction of forward travel of the bicycle, which front portion projects relative to said second wing part of said first wing and constitutes an elastically yieldable element which facilitates the shifting of the chain from said small chain wheel to said larger chain wheel.

11. A derailleur according to claim 7, wherein the additional member has a front portion relative to the direction of forward travel of the bicycle, which front portion projects relative to said second wing part of said first wing and constitutes an elastically yieldable element which facilitates the shifting of the chain from said small chain wheel to said larger chain wheel.

12. A derailleur according to claim 8, wherein the additional member has a front portion relative to the direction of forward travel of the bicycle, which front portion projects relative to said second wing part of said first wing and constitutes an elastically yieldable element which facilitates the shifting of the chain from said small chain wheel to said larger chain wheel.

13. A derailleur according to claim 2, comprising, in addition to said immobilizing means, a spring for elastically maintaining the additional member against said second wing part of said first wing.

* * * * *